United States Patent [19]

Schenk et al.

[11] 4,167,485
[45] Sep. 11, 1979

[54] WATER-SOLUBLE ALKALINE EARTH METAL SALTS OF POLYMERS OF ACRYLIC ACID, AND THEIR USE AS SIZES

[75] Inventors: Wolfgang Schenk, Schwetzingen; Joachim Stedefeder, Lampertheim; Heinz Leitner, Mannheim; Hans-Uwe Schenck, Wachenheim, all of Fed. Rep. of Germany

[73] Assignee: BASF Aktiengesellschaft, Fed. Rep. of Germany

[21] Appl. No.: 891,017

[22] Filed: Mar. 28, 1978

[30] Foreign Application Priority Data

Apr. 2, 1977 [DE] Fed. Rep. of Germany ....... 2714897

[51] Int. Cl.$^2$ ........................................... D06M 13/34
[52] U.S. Cl. ................... 252/8.6; 427/390 R; 427/394; 428/379; 526/240; 526/311
[58] Field of Search ................... 252/8.6, 8.8; 8/18 A; 427/390, 394; 526/240, 311; 428/379

[56] References Cited

U.S. PATENT DOCUMENTS

| 2,819,189 | 1/1958 | Suen et al. ........................... 427/394 |
| 3,519,477 | 7/1970 | Wolf et al. ........................... 427/390 |
| 3,553,160 | 1/1971 | Schroder et al. .................... 526/240 |
| 3,957,710 | 5/1976 | Rohmann et al. ................... 526/311 |

*Primary Examiner*—William E. Schulz
*Attorney, Agent, or Firm*—Keil & Witherspoon

[57] ABSTRACT

A process for sizing staple fiber yarns by applying an aqueous sizing liquor which contains an alkaline earth metal salt of a copolymer containing from 90 to 30% by weight of acrylic acid and/or methacrylic acid and from 10 to 70% by weight of acrylonitrile and/or methacrylonitrile, which copolymer has a viscosity of from 50 to 1,000 cp in 15% strength aqueous solution at 85° C., and drying the treated yarns. The sized films obtained are moisture-insensitive and have good heat stability.

15 Claims, No Drawings

WATER-SOLUBLE ALKALINE EARTH METAL SALTS OF POLYMERS OF ACRYLIC ACID, AND THEIR USE AS SIZES

The present invention relates to water-soluble alkaline earth metal salts of copolymers of acrylic acid and/or methacrylic acid and acrylonitrile and/or methacrylonitrile, and to the use of the copolymers as sizes for staple fiber yarns.

It is conventional practice in the textile industry to treat cotton yarns or yarns of other cellulosic staple fibers with hot liquors containing water-soluble, natural or synthetic products, before the yarns are run on a loom. This yarn pretreatment, referred to as sizing, is carried out to increase the mechanical strength of the spun yarns so that they are better able to withstand the high stresses during weaving than would be possible in the raw and untreated state.

For example, German published application DAS No. 1,594,905 discloses the use of water-soluble sodium salts or ammonium salts of polymers of acrylonitrile and acrylic acid for sizing staple fiber yarns. It is true that these sizes are, in general, outstandingly effective, but the coatings thus produced are moisture-sensitive, so that yarns treated with such sizes stick together, and abrade, under humid conditions. Both phenomena lead to a faulty fabric and to machine breakdown.

It is an object of the invention to provide a water-soluble polymer based on acrylic acid or methacrylic acid which can be used as a size and which, unlike conventional sizes, produces moisture-insensitive films on the sized staple fiber yarns.

We have found that this object is achieved, according to the invention, by using, as the copolymer salt, a water-soluble alkaline earth metal salt of a polymer of (a) from 90 to 30% by weight of acrylic acid and/or methacrylic acid and (b) from 10 to 70% by weight of acrylonitrile and/or methacrylonitrile, with or without (c) up to 30% by weight of acrylamide and/or methacrylamide and/or an acrylic acid ester and/or methacrylic acid ester.

15% strength solutions of these polymer salts in water at 85° C. have viscosities of from 50 to 1,000 cp (measured with a Brookfield RVT viscometer at 100 revolutions per minute). The copolymers preferably contain up to 20% by weight of monomers (c) as copolymerized units, methyl acrylate being the preferred ester.

Surprisingly, the above alkaline earth metal salts are soluble in boiling water and are exceptionally useful as sizes for staple fiber yarns. The new sizes are especially important for sizing staple yarns which consist of cellulose fibers or contain at least 30% by weight of such fibers. They are used especially for sizing pure cellulose fibers or blends of cellulose fibers and polyester fibers and/or acrylonitrile polymer fibers. Continuous viscose rayon filaments can also be sized with the alkaline earth metal salts.

The copolymers may be prepared in the conventional manner by polymerizing the monomers. For example, a process of preparation of the copolymers is disclosed in U.S. Pat. No. 2,819,189. In this process, the monomer mixture is polymerized continuously or batchwise by means of free radical polymerization initiators, preferably in water. If the polymerization of the monomers is carried out by using the alkaline earth metal salts of acrylic acid or methacrylic acid, the compounds of the invention are obtained directly. Preferably, acrylic acid and/or methacrylic acid is copolymerized with acrylonitrile and/or methacrylonitrile, with or without the corresponding amides, in water by a precipitation polymerization method, and the copolymer containing carboxyl groups is then neutralized with alkaline earth metal hydroxides. The resulting aqueous solutions of the alkaline earth metal salts of the copolymers can be employed directly as sizes.

A particularly effective size is obtained by neutralizing the acrylic acid, employed for the polymerization, to the extent of from 10 to 40% by means of alkali metal ions or ammonium ions, carrying out the polymerization in aqueous solution and then neutralizing the resulting aqueous polymer solution with an alkaline earth metal base. The complete neutralization of the copolymers is preferably carried out with the oxides or hydroxides of calcium and/or magnesium. A process of preparing the copolymers, employing partially neutralized acrylic acid or methacrylic acid, is disclosed in German published application DAS No. 2,004,676. The copolymers employed as sizes are at least 50% neutralized.

It is however also possible to isolate the copolymers obtained by precipitation polymerization in water, dry them and mix them with dry alkaline earth metal hydroxide powder. The powder mixtures can readily be dissolved in water, giving a clear solution.

The copolymers of the monomers of components (a) and (b), with or without (c), can also be prepared by the inverse suspension polymerization method disclosed in German Pat. No. 1,081,228 or by the inverse emulsion polymerization process disclosed in German Pat. No. 1,089,173. The compounds according to the invention may be obtained by neutralizing the copolymers with alkaline earth metal hydroxides, unless the polymerization has in fact been carried out with the alkaline earth metal salts of acrylic acid and/or methacrylic acid.

Preferably, the compounds of the invention contain from 35 to 85% by weight of acrylic acid as component (a) and from 15 to 65% by weight of acrylonitrile as component (b). They may or may not contain up to 20% by weight of acrylamide and/or methacrylamide. The viscosity of the alkaline earth metal polymer salts of the invention in 15% strength aqueous solution at 85° C. is from 50 to 1,000 cp, preferably from 200 to 600 cp. The viscosities were in each case measured by means of a Brookfield RVT viscometer at 100 revolutions per minute.

The compounds of the invention are above all employed as sizes, but may also be used as thickeners for print pastes, textile finishes and adhesives for use in the building sector. The novel products are of particular importance as sizes for staple fiber yarns which contain, or consist of, cellulose fibers. The yarns may consist of natural and/or regenerated cellulose fibers, e.g. cotton, rayon staple, linen and mixtures of these with one another or with other staple fibers, e.g. polyester or acrylonitrile polymer fibers, but may also consist solely of acrylonitrile polymer fibers or of mixtures of these with other non-cellulose staple fibers. For the purposes of the invention, acrylonitrile polymer fibers means both fibers of acrylonitrile homopolymers and fibers of acrylonitrile copolymers with up to about 20% by weight of other monomers, e.g. methyl acrylate, vinyl acetate and vinyl-pyridines. The staple fiber yarns contain at least 30% by weight of cellulose fibers or acrylonitrile polymer fibers.

The staple fiber yarns are treated with aqueous solutions of the size, as a rule at from 70° to 95° C. Depending on the composition of the copolymer, up to 500 g of the copolymer salt can be dissolved in one liter of water. As a size, an aqueous solution containing from 1 to 20% by weight of the alkaline earth metal salts of the copolymers is generally used. The amount of size applied is from about 2 to 18% by weight, based on the yarn.

The sizing effect achievable with the products of the invention can be improved further by employing salt mixtures, containing an alkaline earth metal and ammonium and/or an alkali metal, of copolymers of (a) from 90 to 30% by weight of acrylic acid and/or methacrylic acid and (b) from 10 to 70% by weight of acrylonitrile and/or methacrylonitrile, with or without (c) up to 30% by weight of acrylamide and/or methacrylamide and/or an alkyl ester (alkyl being generally of 1 to 4 carbon atoms) of acrylic acid and/or of methacrylic acid. The mixtures may be obtained either by combining solutions of alkaline earth metal copolymer salts with solutions of alkali metal copolymer salts or by neutralizing the acid form of the copolymers with mixtures of alkali metal hydroxides and alkaline earth metal hydroxides, preferably with aqeous solutions which contain calcium hydroxide and sodium hydroxide or ammonia.

The viscosity of the copolymer salt mixtures in 15% strength by weight aqueous solution at 85° C. is again from 50 to 1,000 cp. The alkali metal salts of the above copolymers are especially the ammonium salts or sodium salts. However, ammonium salts derived from primary, secondary and tertiary amines and quaternary ammonium hydroxides can also be used. The mixtures should contain from 13.3 to 60% of the carboxyl groups in the form of the alkaline earth metal salt, preferably the calcium and/or magnesium salt. The pH of the size is as a rule from 5 to 12 and preferably from 6.0 to 7.5. By using mixtures of alkaline earth metal salts and alkali metal salts of copolymers of acrylic acid and acrylonitrile, an improved sizing effect is achieved, manifesting itself in a substantial increase in the abrasion resistance and a substantial reduction in the number of broken ends per loom hour. As with the pure alkaline earth metal salts of the copolymers, the mixtures of the alkaline earth metal salts and alkali metal salts give moisture-insensitive films, with high water absorption of the film without becoming tacky. The good heat stability of the compounds according to the invention when compared to that of the conventional ammonium salts of the copolymers is also noteworthy. The calcium salts of the copolymers can be washed out even after heat treatment of a fabric sized with these salts. Hence it is possible, for example, to subject sized fabrics containing, or consisting of, polyester fibers to a heat treatment (heat-setting) and only then to remove the size, by dissolving it out with water.

The Examples which follow illustrate the invention; in the Examples, parts are by weight, and percentages are based on the weight of the fabrics. The viscosity of the copolymers was measured in 15% strength aqueous solution at 85° C. in a Brookfield RVT viscometer at 100 revolutions per minute.

The abrasion resistance, a measure of the effectiveness of the sizing of staple fibers, was determined by the method of E. Kenk, Textil-Praxis 7 (1952), 698 on a commercial yarn abrasion tester.

The pendulum hardness, a measure of the moisture sensitivity of the film, was determined on an Albert-König pendulum hardness tester at 65% relative atmospheric humidity/20° C. ($P_1$) and 85% relative atmospheric humidity/20° C. ($P_2$).

The products of the invention can be recovered by the method disclosed in Belgian Pat. No. 846,579 and can be re-used for sizing.

In the Examples and Comparative Examples given below, the following sizes were used:

Size 1: The Mg salt of a copolymer of 50% by weight of acrylic acid and 50% by weight of acrylonitrile, viscosity 120 cp, pH=8.0.

Size 2: The Mg salt of a copolymer as in size 1, but with viscosity 700 cp, pH=5.6.

Size 3: The Ca salt of a copolymer of 50% of acrylic acid and 50% of acrylonitrile, viscosity 120 cp, pH=7.2.

Size 4[(1)]: The $NH_4$ salt of a copolymer of 75% of acrylic acid and 25% of acrylonitrile, viscosity 290 cp, pH=6.8.

Size 5: The Mg salt of a copolymer as in size 1, but with viscosity 305 cp, pH=6.2.

Size 6: The Ca salt of a copolymer as in size 3, but with viscosity 275 cp, pH=8.2.

Size 7: The Na salt of the copolymer used in size 1, pH=7.5.

Size 8: The $NH_4$ salt of the copolymer used in size 1, pH=6.8.

Size 9: A polyvinyl alcohol having a degree of polymerization of about 1,400, degree of hydrolysis 86–89%, pH=5.6.

[(1)] Size 4 was prepared by a method based on Example 1 of German published application DAS No. 2,004,676.

The pH of sizes 1 to 9 was determined on a 5% strength aqueous sample.

EXAMPLE 1

A carded Nm 68/1 cotton staple fiber yarn was treated with a 10% strength aqueous solution, at 80° C., of size 1, on a laboratory sizing machine which essentially consisted of a pair of nip rollers with a heated size box, a drying tunnel, 190 cm long and of 7 cm diameter, through which air at 170° C. flows, and a constant-tension wind-up unit. Four individual yarns were combined to a sliver before dipping in the size liquor and were squeezed off after a single immersion, giving a film of 12.7% by weight, based on the dry weight of the yarn. After passing through the drying tunnel at 10 m/min, the yarn sliver was divided up into the four original individual yarns by means of four vertical separator rods and these yarns were wound up under constant tension. After 24 hours' conditioning of the sized material at 65% relative atmospheric humidity and 20° C., the abrasion resistance was measured. The film proved insensitive to moisture, and non-tacky.

For comparison, the same yarn was treated with 10% strength aqueous solutions of the conventional sizes 7, 8 and 9, under identical conditions. The results are summarized in Table 1.

Preparation of Sizing 1

A solution of 1.35 kg of potassium peroxydisulfate in 523 l of fully demineralized water is introduced into a stirred autoclave. The gas space is charged 3 times with 5 bars pressure of nitrogen, and let down in each case.

The solution is then heated with vigorous stirring, and at 70° C. internal temperature a homogeneous mixture of 135 kg of acrylonitrile and 135 kg of acrylic acid is introduced uniformly over 4 hours. Synchronously therewith, a solution of 700 g of sodium disulfite ($Na_2S_2O_5$) in 35 l of fully demineralized water is introduced uniformly.

As the third feed stream, a solution of 1.8 kg of potassium peroxydisulfate in 90 l of fully demineralized water is introduced uniformly over 3 hours, commencing one hour after the start of the first addition.

The total polymerization time is 4 hours at 70° C. and 1 hour at 80° C.

Non-polymerized acrylonitrile is then substantially removed by degassing under a suction of −0.5 bar at 80° C., whilst stirring. The fine polymer precipitate is then deliberately coarsened over 15 minutes by uniformly adding 100 l of a 10% strength aqueous ammonium sulfate solution.

The suspension is then cooled whilst stirring and is spray-dried after passing through a 2 mm sieve.

The diameter of the spray-dried product is virtually entirely below 0.2 mm. The product can easily be mixed homogeneously with the requisite amount of magnesium oxide powder.

In the polyacid form, the product has an acid number of about 300 and a K value of 70 (measured by the Fikentscher method on a 1% strength solution in dimethylsulfoxide). Preparation of the sizing solution:

The polyacid powder, as such or as an aqueous suspension, is mixed with the stoichiometric amount of magnesium oxide (2 COOH:1 MgO; 100 g of polymer + 14 g of MgO) and is dissolved at about 90° C. to give a 15% strength by weight aqueous solution. The viscosity of the solution is about 120 cp at 85° C.

TABLE 1

| Example | Amount of size applied % by weight | Abrasion resistance | Pendulum hardness P₁ | P₂ |
|---|---|---|---|---|
| (1) Size 1 | 12.1 | 976 | 116 | 27 |
| Comparative Examples | | | | |
| (1a) Size 7 | 13.2 | 1,005 | 10 | 5 |
| (b) Size 8 | 13.2 | 980 | 22 | 14 |
| (c) Size 9 | 12.7 | 730 | 20 | 7 |

EXAMPLE 2

Using the apparatus described in Example 1, a polyester-cotton yarn (65:35; Nm 69/1) was sized with 15% strength aqueous solutions of the sizes shown in Table 2. The sizing liquor was in each case at 80° C. The results are summarized in Table 2.

TABLE 2

| Examples | Amount of size applied % by weight | Abrasion resistance | Pendulum hardness P₁ | P₂ |
|---|---|---|---|---|
| (2a) Size 1 | 16.6 | 2,472 | 116 | 27 |
| (b) Size 2 | 16.3 | 2,617 | 125 | 30 |
| Comparative Examples | | | | |
| (2a) Size 7 | 16.6 | 2,400 | 10 | 5 |
| (b) Size 8 | 16.3 | 2,327 | 22 | 14 |
| (c) Size 9 | 16.4 | 2,568 | 20 | 7 |

EXAMPLE 3

A polyester-cotton yarn (65:35, Nm 69/1) was sized with 14% strength aqueous solutions, at 80° C., of the sizes shown in Table 3. The results are summarized in Table 3. The synergistic effect exhibited by mixtures of alkali metal salts and alkaline earth metal salts of acrylic acid copolymers is clearly apparent.

TABLE 3

| Examples | Size | Amount of size applied % by weight | Abrasion resistance |
|---|---|---|---|
| (3a) | Size 4 + sizing 1 in the weight ratio of 1:1 | 16.4 | 2,938 |
| (b) | Size 4 + size 3 in the weight ratio of 1:1 | 16.3 | 2,383 |
| (c) | Size 1 | 16.9 | 2,405 |
| (d) | Size 3 | 16.7 | 1,196 |
| Comparative Example (3a) | Size 4 | 16.5 | 1,175 |

The films obtained in Examples 3a to d are moisture-insensitive and non-tacky, whilst in Comparative Example 3a moisture-sensitive films are obtained. In Examples 3a and 3b, 38.1% of the carboxyl groups of the copolymer mixture are neutralized by an alkaline earth metal base.

EXAMPLE 4

About 2,000 m of Nm 68/1 cotton yarn were sized on a Sucker sizing machine with 7 cans under the conventional conditions, at 90° C. liquor temperature, using the formulation shown below. The wet pickup was about 100% and the drying cylinders were at from 120° to 140° C. The sizing liquor was prepared in a turbo-kettle (15 minutes, 105° C.).

Formulation:
    24 kg of size 1
    0.1 kg of stearic acid monoglyceride
    300 l of water The sized warp was weighted with 9.8% by weight of size 1, based on the dry weight of the yarn, and had a residual moisture content of 8% by weight. It was woven on an automatic loom, at 220 picks/min, at 70% relative atmospheric humidity and 20°-22° C., to give a fabric of which the construction is shown in Table 4.

TABLE 4

| Construction of the cotton fabric | |
|---|---|
| warp setting: | 41 ends/cm |
| filling setting: | 42 picks/cm |
| filling yarn: | Nm 60/1 |
| total number of ends: | 6,050 |
| weave: | linen, 1/1 |

A statistical evaluation of the weaving experiment gave 0.22 broken ends per weaving hour.

Comparative experiments carried out under identical conditions with 24 kg of size 8 and of size 7 gave from 0.45 to 0.56 broken ends per weaving hour. All the fabrics were of 1st quality.

EXAMPLE 5

About 2,000 m runs of Nm 68/1 cotton yarn were sized with the following formulations, under the conditions described in Example 4:

| Formulation 1 | Formulation 2 |
|---|---|
| 38 kg of size 4 | 30 kg of size 4 |
| 460 l of water | 8 kg of size 1 |
| | 460 l of water |

| Formulation 3 | Formulation 4 |
|---|---|
| 30 kg of size 4 | 38 kg of size 1 |
| 8 kg of size 3 | 460 l of water |

-continued

| 460 l of water |
|---|

In Formulations 2 and 3, 13.7% of the carboxyl groups of the copolymers are neutralized by an alkaline earth metal base.

The sized warp was used to weave a fabric on a Sulzer automatic loom, at the rate of 240 picks/cm, at 76–78% relative atmospheric humidity and 20°–22° C.; the details of the fabric are given in Table 5.

TABLE 5

| Construction of the cotton fabric | |
|---|---|
| warp setting: | 43 ends/cm |
| filling setting: | 43 picks/cm |
| filling yarn: | Nm 68/1 |
| total number of ends: | 6,372 |
| weave: | linen, 1/1 |

A determination of the abrasion resistance and a statistical evaluation of the broken ends during weaving gave the following results (Table 6):

TABLE 6

| Formulation | Amount of size applied | Abrasion resistance | Broken ends per weaving hour |
|---|---|---|---|
| 1 (Comparative experiment) | 8.2% by weight | 1,163 | 1.07 |
| 2 | 8.4% by weight | 1,486 | 0.74 |
| 3 | 9.0% by weight | 1,257 | 0.76 |
| 4 | 8.5% by weight | 1,145 | 0.85 |

The number of broken ends per weaving hour are substantially greater in the comparative experiment than in the case of the formulations according to the invention.

EXAMPLE 6

Using the sizing machine described in Example 4, about 2,000 m runs of polyester-cotton yarn (65:35; Nm 50/1) were sized with the formulations given below. The liquors were prepared by cooking for 10 minutes in a Sucker pressure kettle at 105° C. The liquor in the sizing box was at 90° C.

| Formulation 1 (Comparative Example) | Formulation 2 |
|---|---|
| 30 kg of size 4 | 24 kg of size 4 |
| 300 l of water | 6 kg of size 5 |
| | 300 l of water |

| Formulation 3 |
|---|
| 24 kg of size 4 |
| 6 kg of size 6 |
| 300 l of water |

Formulations 2 and 3 are Examples according to the invention; in each case 13.3% of the carboxyl groups of the copolymers are neutralized by an alkaline earth metal base.

Each warp was then waxed with from 0.15 to 0.20% by weight, based on the dry warp, of a commercial wax and used on a high-speed automatic loom, running at 220 picks/min, at 70% relative atmospheric humidity and 20°–22° C., to give the poplin fabric specified in Table 7.

TABLE 7

| warp setting: | 45.5 |
|---|---|
| filling setting: | 25.0 |
| filling yarn: | Nm 50/1 |
| total number of ends: | 7,480 |

TABLE 7-continued

| weave: | linen, 1/1 |
|---|---|

The determination of the abrasion resistance and the statistical evaluation of the broken ends during weaving gave the following results (Table 8):

TABLE 8

| Formulation | Amount of size applied | Abrasion resistance | Broken ends per weaving hour |
|---|---|---|---|
| 1 (Comparative experiment) | 14.4% by weight | 2,421 | 0.40 |
| 2 | 14.8% by weight | 4,961 | 0.17 |
| 3 | 14.7% by weight | 4,795 | 0.19 |

All the fabrics were of 1st quality, but the number of broken ends per weaving hour was substantially higher in the Example according to the prior art (formulation 1) than in the Examples according to the invention.

EXAMPLE 7

About 2,000 m of the poplin fabric specified in Example 6, which was brushed to remove loom dust and was weighted with 9.1% by weight of size 1 as a result of the sizing process described, were drawn at a speed of 40 m/min through a dip trough charged with fully demineralized water at 50° C. The fabric was dipped for 2 periods of 1 second, and water adhering to the surface was doctored off after dipping. After 10 seconds' swelling time in an air passage, the fabric was squeezed off on a pad-mangle under maximum pressure. A 7% strength sizing liquor was obtained, the yield being 47% of the theoretical amount of recoverable active ingredient. Carded Nm 20/1 cotton yarn was sized with this recovered liquor, which was freed from fiber dust by filtration, and with a 7% strength liquor of the original size, on the laboratory sizing machine described in Example 1, at a liquor temperature of 80° C., so as to produce a weighting of from 5 to 5.5% by weight of the size, based on the dry weight of the warp yarn. A determination of the abrasion resistance of both yarns after 24 hours' standard conditioning showed virtually equivalent sizing effects (Table 9).

TABLE 9

| Sizing | Amount of size applied | Abrasion resistance |
|---|---|---|
| original size 1 | 5.5% by weight | 1,598 |
| regenerated size 1 | 5.3% by weight | 1,621 |

This Example shows that the size of the invention can be recovered and re-used.

What we claim is:

1. A process for sizing a staple fiber yarn which comprises applying to the yarn an aqueous sizing liquor which contains a water-soluble alkaline earth metal salt of a copolymer of
   (a) from 90 to 30% by weight of acrylic acid and/or methacrylic acid,
   (b) from 10 to 70% by weight of acrylonitrile and/or methacrylonitrile and
   (c) from 0 up to 30% by weight of acrylamide and/or methacrylamide and/or an acrylic acid ester and/or a methacrylic acid ester, which salt has a viscosity of from 50 to 1,000 cp in 15% strength aqueous solution at 85° C., and drying the treated yarn.

2. A process as claimed in claim 1, wherein a staple fiber yarn which consists of cellulose fibers or contains at least 30% by weight of such fibers, is sized.

3. A process as claimed in claim 1, wherein a salt mixture of a copolymer of
   (a) from 90 to 30% by weight of acrylic acid and/or methacrylic acid and
   (b) from 10 to 70% by weight of acrylonitrile and/or methacrylonitrile with an alkali metal and an ammonium and/or an alkaline earth metal is employed, the salt mixture having a viscosity of from 50 to 1,000 cp in 15% strength aqueous solution at 85° C., and from 13.3 to 60% of the neutralized carboxyl groups of the copolymer being neutralized by the alkaline earth metal.

4. A process as claimed in claim 1, wherein the viscosity of the alkaline earth metal copolymer salt in 15% strength aqueous solution at 85° C. is from 200 to 600 cp.

5. A process as claimed in claim 1, wherein the pH of the copolymer salt solution is from 5 to 12.

6. A process as claimed in claim 1, wherein the pH of the copolymer salt solution is from 6.0 to 7.5.

7. A process as claimed in claim 1, wherein the copolymer contains up to 20% by weight of copolymerized units of methyl acrylate as component (c).

8. A staple fiber yarn which has been sized by a process as claimed in claim 1.

9. A water-soluble alkaline earth metal salt of a copolymer of
   (a) from 90 to 30% by weight of acrylic acid and/or methacrylic acid,
   (b) from 10 to 70% by weight of acrylonitrile and/or methacrylonitrile, and
   (c) from 0 up to 30% by weight of acrylamide and/or methacrylamide and/or an acrylic acid ester and/or a methacrylic acid ester, which salt has a viscosity of from 50 to 1,000 cp in 15% strength aqueous solution at 85° C.

10. A salt as claimed in claim 9 having a viscosity of from 200 to 600 cp in 15% strength aqueous solution at 85° C.

11. A salt as claimed in claim 9 containing up to 20% by weight of the monomer component (c).

12. A salt as claimed in claim 11 wherein component (c) is methyl acrylate.

13. A salt as claimed in claim 9 wherein component (a) is acrylic acid in a proportion of 85 to 35% by weight, and component (b) is acrylonitrile in a proportion of 15 to 65% by weight.

14. A salt as claimed in claim 9 containing at least from 13.3 to 60% of the carboxyl groups in the form of the alkaline earth metal salt.

15. A salt as claimed in claim 9 wherein said alkaline earth metal salt is the calcium and/or magnesium salt.

* * * * *